(12) United States Patent
Piett et al.

(10) Patent No.: US 12,505,497 B2
(45) Date of Patent: Dec. 23, 2025

(54) INTER-AGENCY COMMUNICATION SYSTEM FOR PROMOTING SITUATIONAL AWARENESS

(71) Applicant: Rave Wireless, Inc., Framingham, MA (US)

(72) Inventors: William Todd Piett, Whitinsville, MA (US); Brett Wilfred Marceau, Northboro, MA (US); Laura J. Costello, Arlington, MA (US); Crystal Leigh Ayco, Kenmore, WA (US)

(73) Assignee: RAVE WIRELESS, INC., Framingham, MA (US)

( * ) Notice: Subject to any disclaimer, the term of this patent is extended or adjusted under 35 U.S.C. 154(b) by 414 days.

(21) Appl. No.: 17/834,310

(22) Filed: Jun. 7, 2022

(65) Prior Publication Data
US 2023/0087197 A1  Mar. 23, 2023

Related U.S. Application Data

(60) Provisional application No. 63/245,457, filed on Sep. 17, 2021.

(51) Int. Cl.
*G06Q 50/26* (2024.01)
(52) U.S. Cl.
CPC .................. *G06Q 50/26* (2013.01)
(58) Field of Classification Search
CPC ..................................................... G06Q 50/26
See application file for complete search history.

(56) References Cited

U.S. PATENT DOCUMENTS

| | | | |
|---|---|---|---|
| 3,999,308 A * | 12/1976 | Peters | G09B 9/302 348/123 |
| 9,742,709 B1 * | 8/2017 | Laich | H04L 51/046 |
| 11,288,441 B1 * | 3/2022 | Tanner | G06Q 50/26 |
| 2006/0247709 A1 * | 11/2006 | Gottesman | A61N 1/37282 607/30 |
| 2007/0105528 A1 * | 5/2007 | Haas | H04W 76/50 455/466 |
| 2015/0242194 A1 * | 8/2015 | Vargas | G06F 8/51 717/137 |

(Continued)

FOREIGN PATENT DOCUMENTS

| | | | | |
|---|---|---|---|---|
| CN | 110520872 A * | 11/2019 | | G06F 16/86 |
| EP | 0858201 A2 * | 8/1998 | | |
| WO | WO-2014089539 A1 * | 6/2014 | | G06Q 30/016 |

OTHER PUBLICATIONS

NENA: The 9-1-1 Association "EIDO & IDX Frequently Asked Questions (FAQ) Jul. 13, 2019" 2019, https://www.nena.org/page/EIDOFAQs.

(Continued)

*Primary Examiner* — Lynda Jasmin
*Assistant Examiner* — Shaun D Sensenig

(57) ABSTRACT

An inter-agency communication system configured to translate unnormalized data from emergency-response agencies into normalized data, to identify an actionable incident from the normalized data and to output a workflow corresponding to the actionable incident and/or to cause selected information concerning the actionable incident to be placed into a situational-awareness container to be made available to the emergency-response agencies.

20 Claims, 2 Drawing Sheets

(56) References Cited

U.S. PATENT DOCUMENTS

| | | | |
|---|---|---|---|
| 2016/0063191 A1* | 3/2016 | Vesto | G16H 50/50 |
| | | | 705/2 |
| 2016/0132585 A1* | 5/2016 | Aasen | G06F 16/285 |
| | | | 707/738 |
| 2018/0103073 A1* | 4/2018 | Rosenberg | H04L 61/4555 |
| 2021/0227371 A1* | 7/2021 | Thomas | H04L 67/303 |

OTHER PUBLICATIONS

NENA and APCO, " NENA/APCO Emergency Incident Data Document (EIDD) Information Document" 2014.

\* cited by examiner

INTER-AGENCY COMMUNICATION SYSTEM FOR PROMOTING SITUATIONAL AWARENESS

RELATED APPLICATIONS

This application claims the benefit of the Sep. 17, 2021 filing date of U.S. Provisional Application 63/245,457, the contents of which are incorporated herein by reference.

FIELD OF INVENTION

The invention relates to emergency management, and in particular, to the promotion of situational awareness.

BACKGROUND

On a battlefield, a "fog of war" arises in part because of difficulty in communicating information to all acting parties. As a result of miscommunication, the various actors may lack sufficient situational awareness. This can lead to human error or delayed response.

A similar difficulty arises during a public emergency. The resources used to respond to an emergency tend to be organized by community. Within a community, there may be distinct emergency services, each of which sends responders to the scene of the emergency. A large-scale public emergency often requires recruiting resources from different communities. As a result, it is important to promote communication and sharing of information between these different resources. Doing so promotes situational awareness and, as a result, effective action.

To mount an effective response to a public emergency, it is useful for the responders to have all the information they need. It is also useful to avoid inundating responders with excessive information. Given the disparate resources being mobilized, it is difficult to ensure that each responder has the appropriate information for maximizing situational awareness.

SUMMARY

In one aspect, the invention features an inter-agency communication system configured to translate unnormalized data from emergency-response agencies into normalized data, to identify an actionable incident from the normalized data, and to either output a workflow corresponding to the actionable incident and/or to cause selected information concerning the actionable incident to be placed into a situational-awareness container to be made available to the emergency-response agencies.

In some embodiments, the inter-agency communication system includes a normalizing module comprising first and second translators. The first translator converts unnormalized data that is in a first format into normalized data. The second translator converts unnormalized data that is in a second format into normalized data.

In other embodiments, the inter-agency communication system includes an analysis module configured to identify an actionable incident based on the normalized data.

In still other embodiments, the inter-agency communication system includes a workflow module and a workflow set that includes pre-defined workflows. The workflow module is configured to receive information indicative of an actionable incident and to select one of the pre-defined workflows based on the information.

Among these are embodiments in which the workflow module receives additional information as the incident unfolds over time and uses that additional information to adaptively modify a workflow. In some of these embodiments, adaptively modifying the workflow includes causing logic branches to occur within that workflow.

In others of the embodiments, the workflow module causes the workflow to prematurely terminate upon receiving additional information. As an example, a workflow module that receives information indicating a false alarm terminates a workflow or at least modifies those parts of the workflow that are pertinent to the existence of a false alarm.

Among these embodiments are those in which the additional information comes from other systems that interact with or are integral with the inter-agency communication system and those in which the additional information comes from individual users who interact with the inter-agency communication system.

In some embodiment the workflow module causes the workflow to transition between states based on the acquisition of additional information that arrives during the course of responding to a particular emergency. As a result, the workflow is adaptive and dynamically responds to changing circumstances.

Among the embodiments are those in which the inter-agency communication system includes an analysis module configured to cause selected information concerning the actionable incident to be excluded from the situational-awareness container and to cause other selected information concerning that incident to be included in the situational-awareness container.

Embodiments also include those in which the analysis module wholly suppresses information about the actionable incident including those in which the analysis module withholds information about the existence of an incident. Examples include those in which the analysis module suppresses information concerning the existence of an incident when that incident is not relevant to any agency but the agency that originated that incident.

Also among these embodiments are those in which the analysis module withholds certain sensitive information from a specific user or from all users that belong to a particular category of users. Examples include those in which the analysis module suppresses information that provides details of an active investigation that is restricted to only those law-enforcement officers working on that investigation. In such embodiments, the analysis module would make such information only available to those law-enforcement officers with a need-to-know.

Embodiments further include those in which the inter-agency communication system is configured to receive the unnormalized data from a local system of one the emergency-response agencies. Examples of such systems include a computer-aided dispatch system, an automatic vehicle-location system, and a surveillance system, such as a gunshot detection system.

Still other embodiments include those in which the inter-agency communication system updates a system that is local to one or more of the emergency-response agencies.

In some embodiments, the inter-agency communication system is configured to supply an evanescent link to the second agency. The evanescent link is one that expires after the actionable incident has completed and can thus be considered a one-time use link. Such a link temporarily endows the second agency with the ability to fully participate in the emergency for the duration of the actionable incident. As a result, the second agency is able to receive information to promote its situational awareness and, if necessary, to participate in a workflow. Examples of a second agency that would benefit from temporary endowment of such an ability include those that do not normally monitor 9-1-1 calls but that may nevertheless find themselves in the throes of an emergency. These include institutions known to be prone to mass shootings, such as schools and houses of worship, or locations that are prone to terrorist activity, such as transportation hubs, and other institutions at which emergencies might occur, such as nursing homes and hospitals or certain big-box stores and other locations at which members of the public gather in significant numbers. In other embodiments, the agency consists of a set of one or more individuals who would not normally participate in responding to an emergency but who might, nevertheless, be called upon to do so as a result of exigencies of the situation. Examples of such individuals include social workers or mental health professionals, translators or interpreters, and other volunteers whose particular skills are deemed to be necessary for successfully responding to the circumstances at hand.

Still other embodiments include those in which the inter-agency communication system is configured to provide an evanescent link to a non-subscribing agency. Such an evanescent link permits the non-subscribing agency to access the situational-awareness container so as to view the information subject to a restriction imposed by the inter-agency communication system on access to that information by the non-subscribing agency. For purposes of construing the language, the term, "restriction" includes a compound restriction that comprises two or more restrictions. Among these are embodiments are those that restrict access by the non-subscribing agency to only viewing the information and those that permit the non-subscribing agency to both view and modify some or all of the information. In the latter case, modified information is propagated to one or more modules of the inter-agency communication system, such as the workflow module, and to other agencies that are participating in handling the actionable incident.

In other embodiments, the inter-agency communication system is configured to permit the agencies to modify information in the situational-awareness container.

Still other embodiments include those in which the inter-agency communication system both outputs the workflow and causes selected information concerning the actionable incident to be placed into the situational-awareness container to be made available to the emergency-response agencies and those in which the inter-agency communication system translates normalized data into unnormalized data for consumption by a local system at one of the emergency-response agencies.

Further embodiments include those in which the inter-agency communication system translates normalized data into unnormalized data and then provides that unnormalized data to a non-subscribing agency. In still other embodiments, the inter-agency communication system provides a way to communicate between local systems of different agencies notwithstanding differences between the communication formats of those local systems. As an example, a first agency may lack the ability to handle 9-1-1 calls, as a result of which a second agency handles such calls on the first agency's behalf. In such cases, the second agency receives information about an emergency through a 9-1-1 call and relays that information to the inter-agency communication system. The inter-agency communication system then communicates that information to the first agency, thereby permitting the first agency to respond as if it could, in fact, handle 9-1-1 calls.

In yet other embodiments, updates or other actions applied to incidents managed within the inter-agency communications system are propagated back to the agency that originated that incident. This permits agencies to collaborate on responding to the incident without having to expose the local system of that originating agency to other agencies or to individuals or systems outside that originating agency.

Embodiments further include those in which the analysis module comprises a rule repository that stores rules provided by each of a plurality of subscribing agencies. In such embodiments, the analysis module receives information indicative of occurrence of a condition uses it to cause a rule from the rule repository to execute along a particular execution path that corresponds to the condition.

Still other embodiments include those in which the analysis module comprises a repository of associations between conditions and execution paths and detect that a condition stored in the repository has occurred. Upon such detection, the analysis module causes the rule to be executed along an execution path that is associated with the condition in the repository.

Embodiments further include those in which the workflow module stores a set of workflows, each of which corresponds to a type of actionable incident. In response to receiving information indicative of an actionable incident, the workflow module retrieves a workflow corresponding to the actionable incident and provides the workflow thus retrieved to a delegate.

Also among the embodiments are those in which the workflow module is configured to transmit, to a delegate, a workflow corresponding to an actionable incident and to also transmit reminders to the delegate in response to failing to detect completion of a task in the workflow by a particular deadline.

Still other embodiments include those in which the situational-awareness container receives external information from an external-information source and updates information in the situational-awareness container based on the external information.

In other embodiments, the analysis module receives external information from an external information-source, uses the external information to determine that a condition has been met, and then proceed to modify a rule that has been provided by one of the agencies. As a result of such modification, that rule, when executed, follows an execution path that depends on the condition having been met.

The various devices that are used to carry out the foregoing operations are non-abstract devices that are made of matter, that consume energy, and that at least have the technical effect of producing waste heat. In particular, the various devices include electronic devices in which variations in electrical potential result in the technical effects described herein. The devices are not generic computers but special-purposes digital processing devices that have been especially configured, either by hardware, firmware, software, or both to carry out the functions recited herein and to do so in a non-abstract manner. In addition, the various methods recited in the claim have been found to be impracticable to carry out purely by mental steps carried out by a human being. The claimed subject matter also provides a technical improvement in the operation of a physical apparatus by enabling that apparatus do what it could not otherwise do had it not been so modified. To the extent the improvement is not readily apparent, it is because the improvement, like the claimed subject matter, is non-obvious.

It is possible for a person to disagree with one or more of the foregoing assertions. However, this would merely prove that it is possible to interpret the claims improperly by not doing so in light of the specification.

The claims herein shall be construed to cover only non-abstract implementations. As used herein, "non-abstract" shall mean the converse of "abstract" as that term has been defined by the Courts of the United States as of the filing of this application. Accordingly, any person who construes the claims as covering abstract subject matter or otherwise lacking in technical effect shall be regarded as having failed to construe the claims in light of the specification.

These and other features of the invention will be apparent from the following detailed description and the accompanying drawing, in which:

DETAILED DESCRIPTION

Figure 1:
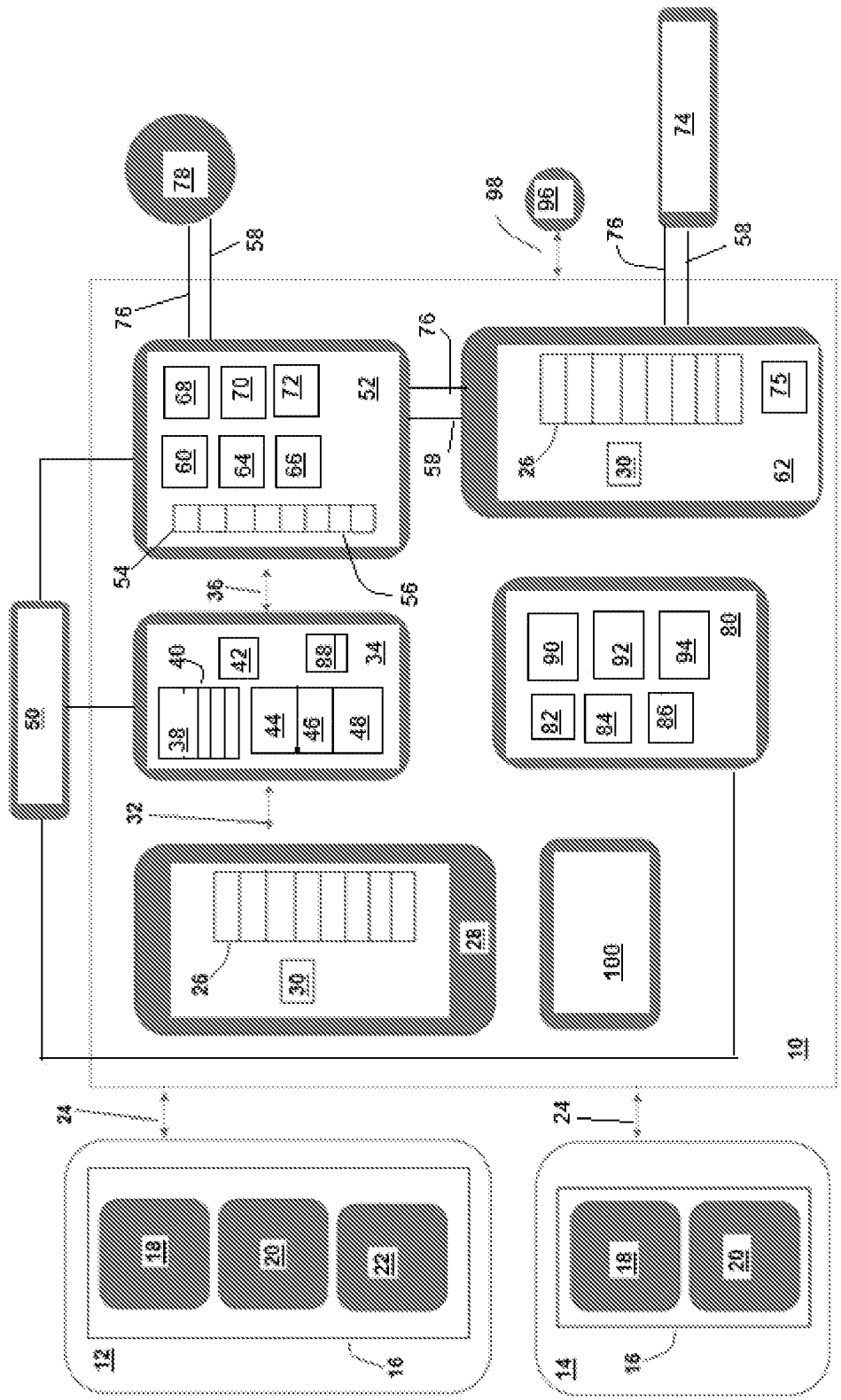
FIG. 1 shows a system for sharing information among agencies that participate in management of an emergency and FIG. 2 shows a system similar to that shown in FIG. 1 but with the third-party system providing information to a non-subscribing agency. Within the figures, those communication links between modules that the following description refers to have been shown. However, this is not to imply that no links exist between others of the modules. Such links have been omitted to avoid visual clutter. In fact, all modules shown freely interchange data with each other, either directly or by accessing common intermediate storage.

FIG. 1 shows an inter-agency communication system 10 in communication with first and second responding agencies 12, 14. The first and second responding agencies 12, 14 subscribe to the inter-agency communication system 10. They therefore receive the full panoply of services provided by the inter-agency communication system 10.

Examples of responding agencies 12, 14 that subscribe to the inter-agency communication system 10 include 9-1-1 call centers, fire departments, police departments, and private security services, such as campus security services, corporate security services, emergency medical service organizations, providers of mental health services, and providers of crisis intervention services.

A responding agency 12, 14, referred to herein as "agency" for brevity, typically relies on its local system 16. Such systems are referred to herein as "local" because they are locally controlled or accessed by a particular agency, whether they be physically inside the agencies' premises, or whether hosted elsewhere, including by having an account on a multi-tenant software-as-a-service provider that serves many agencies. 12, 14. Each such local system 16 receives, processes, and communicates certain kinds of information. Examples of a local system 16 include a computer-aided dispatch system 18, an automatic vehicle-locator 20, which provides information on the location of the responding agency's assets, and various surveillance systems 22, an example of which is a gunshot detector.

The various local systems 16 that are deployed among the responding agencies 12, 14 are often systems that have been provided over the years by different vendors, some of which may no longer exist. Many such local systems 16 are thus legacy systems that use their own peculiar format for storing data. In many cases, these formats, which will be referred to herein as the "local format," is obsolete and/or unsupported, or do not conform to a de-facto or documented standard. These local formats are sometimes unique to the local system's manufacturer. As a result, different local systems 16 often have different local formats. These local systems 16 are often not cloud-based systems but are instead maintained at a local level. The plethora of local formats among local systems 16 inhibits inter-agency communication.

The inter-agency communication system 10 includes a library of translators 26 for a significant fraction of known local formats associated with these legacy systems. The library of translators 26 is periodically updated as needed.

Within the inter-agency communication system 10, a normalizing module 28 includes these translators 26. The normalizing module 28 receives unnormalized data 24 from each of the various local systems 16 in the local format that is used by that local system 16. This received data will be referred to herein as the "unnormalized data 24."

The normalizing module 28 further includes a switch 30 that identifies the local format that corresponds to the received unnormalized data 24. Based on its having identified the local format or by preconfigured knowledge based on the sender of the unnormalized data 16 or identify of the agency 12 14, the switch 30 routes the unnormalized data 24 to an appropriate one of the translators 26.

Each translator 26 reformats the unnormalized data 24 that it receives into normalized data 32 that uses a normalized format. In some embodiments, the translators 26 are bidirectional. A bidirectional translator 26 is able to convert normalized data 32 that may have been received from other local systems 16 into unnormalized data 24 and to provide that unnormalized data 24 back to the relevant local system 16. This feature permits one local system 16 to interpret information that has been provided by other local systems 16.

In a typical use case, the first agency 12 receives a call concerning an incident. The first agency 12 collects information about that incident and provides that information to the inter-agency communication system 10. In doing so, the first agency 12 uses the local format associated with its own local system 16. The transmitted data is thus considered to be unnormalized data 24.

The normalizing module 28 of the inter-agency communication system 10 receives this unnormalized data 24 and uses its switch 30 to direct it to the correct translator 26. The translator 26 thus translates the unnormalized data 24 into normalized data 32, which it then provides to an analysis module 34.

The analysis module 34 classifies the normalized data 32 as representing either an actionable incident 36 or a non-actionable incident. An actionable incident 36 invokes operation of the remaining components of the inter-agency communication system 10. A non-actionable incident does not do so.

An actionable incident 36 often includes one or more associated events. Each event is characterized by its type, its location, and its time of occurrence. Examples of a "type" of event include "gunshot," "fire," "chemical explosion," and the like.

The analysis module 34 considers events to obey an algebra similar to that used in set theory. Thus, when appropriate, the analysis module 34 can consider the union or intersection of multiple events to be an event in itself.

Because it either occurs or does not occur, an event can be viewed as a binary variable. With this in mind, the analysis module 34 has the option of defining synthetic events by combining events using rules of Boolean algebra. The analysis module 34 uses these events as a basis for assessing an appropriate plan for responding to the overall actionable incident 36.

The illustrated analysis module 34 includes a rule repository 38 for storing rules 40 that are provided by the agencies 12, 14. The analysis module 34 knows the agency 12, 14 that reported the incident and therefore knows which body of rules 40 is applicable. Based on the details of the report, the analysis module 34 identifies one or more of the rules 40 for execution.

A typical rule 40 has conditional statements that define different execution paths corresponding to different conditions that are either present or foreseeable in the actionable incident 36. A rule synthesizer 42 prepares the rule 40 for execution by associating different execution paths with such conditions.

Conditions that affect a rule's execution path fall into three classes: conditions related to the situs of the incident 36, conditions related to the facilities involved in the incident 36, and conditions that are associated with any persons involved in the incident 36.

For those cases in which the situs of the incident 36 is a factor in changing execution path, a geofencing repository 44 stores associations between particular locations and execution paths corresponding to those locations.

An example of the incident's situs having an effect on a rule's execution path would arise when an actionable incident 36 occurs at a sensitive location. It is therefore useful to provide the analysis module 34 with a geofencing repository 44 that stores information identifying sensitive locations and execution paths that a rule 40 should follow based on occurrence of an event at such a location. For example, if the event includes the gathering of a restive crowd at a courthouse or legislative building, the rule 40 would traverse an execution path that would result in a response that differs from that which would result from gathering of a similar crowd at a toxic-waste dump.

Another example of the incident's situs having an effect on a rule's execution path would arise when an actionable incident 36 occurs within a particular district of a multi-district region over which a responding agency 12, 14 has jurisdiction. In such a case, the geofencing repository 44 includes information associating each such district with corresponding resources and personnel. The resulting rule 40 would then follow an execution path that includes dispatching a particular subset of available resources or notifying a particular subset of relevant personnel or both.

For those cases in which the organization impacted by the incident 36 is a factor in changing execution path, it is useful to provide the analysis module 34 with a facilities repository 46 that stores associations between particular organizations and execution paths corresponding to those organizations.

An example of an organization being a factor in changing a rule's execution path arises if the incident 36 occurs in a school that is one of many schools in a particular town. In such a case, a rule 40 would follow an execution path that would include notifying the superintendent of schools. The execution path in this case does not depend so much on location but on the fact that a particular organization, i.e., a school system, was affected.

Another example of an organization being a factor in changing a rule's execution path arises when an actionable incident 36 impacts a facility having a complex layout. A responder who is sent to such a facility could easily become lost or disoriented within the facility. To address this situation, the condition that an incident 36 has occurred at a particular facility may cause the rule 40 to follow an execution path that would include providing a map or similar information to assist emergency responders who are expected to enter that facility. An association between such a condition and the corresponding execution path, with its associated actions, is likewise stored in the facilities repository 46.

In another example, it may be that the situs of the incident 36 is known to have a history of domestic violence incidents. In such a case, the rule 40 would follow an execution path that includes sending personnel trained to deal with such disturbances. Such information would likewise be stored in the facilities repository 46.

For those cases in which the person impacted by the incident 36 is a factor in changing execution path, it is useful for the analysis module 34 to include a personal-information repository 48 that stores associations between particular persons and execution paths for those cases. This is particularly likely when the incident 36 is a medical emergency.

In such cases, a rule 40 may follows an execution path that results from a condition that depends on medical information about that person. For example, based on the existence of such a condition, a rule may identify certain equipment that should be brought or personnel to dispatch. Thus, if the condition of a person is that of having certain mental health difficulties, the rule 40 may cause dispatch of a suitable mental health professional.

Information for inclusion in any of the foregoing repositories 44, 46, 48 can, in some cases, come from an external information-source 50.

For example, based on information from the external information-source 50, the analysis module 34 may add information, to the facilities repository 46 indicating that a particular residence has had a history of domestic violence incidents. Similarly, based on information from the external information-source 50, the analysis module 34 may add, to the personal-information repository 48, information indicating that a particular person has significant mental health issues. The analysis module 34 would then use such information to ensure that the relevant rule 40, when executed, will cause a message to be sent to a selected detective in the former case and will cause a message to be sent to the relevant social worker in the latter case.

In other embodiments, the external information-source 50 provides the analysis module 34 with information indicative of a potentially actionable incident 36. This is carried out independently of the first or second agency 12, 14.

In one example, the external information-source 50 is a source of current weather-related information. Upon learning of a weather-related event, such as an approaching electrical storm, the external information-source 50 provides the analysis module 34 with information concerning the storm, its estimated track, and its velocity. The analysis module 34 evaluates this information. If necessary, the analysis module 34 generates an actionable incident 36. This occurs in much the same way as it would have had the information instead originated at one of the first and second agencies 12, 14.

In some embodiments, it is useful to have information about available assets. For example, the analysis module 34 may recognize that the situs of the incident is a tall building. It may also recognize that the nature of the incident is a fire. In such cases, after having polled the various agencies 12, 14 for asset information, the analysis module 34 discovers that that the first agency 12 lacks a ladder of sufficient height, that a second agency 14 has a suitable ladder, and that the ladder is at a nearby location. In such a case, the analysis module 34 causes the rule 40 to take this into account, for example by causing a message to be sent to the second agency 14 to bring its ladder.

The analysis module 34 provides the workflow module 52 with information concerning an actionable incident 36. The workflow module 52 stores a workflow set 54 corresponding to various actionable incidents 36. The workflow set 54 comprises stored workflows 56, each of which corresponds to an actionable incident 36. Based on the actionable incident 36 that it has received from the analysis module 34, the workflow module 52 identifies a selected workflow 58 from the stored workflows 56 of the workflow set 54.

In some embodiments, the stored workflows 56 are predefined workflows. The details of any one of the stored workflows 56 are susceptible to change over time. Thus, if, as a result of experienced gained in similar emergencies, it becomes apparent that one or more workflows from the stored workflows 56 that correspond to that emergency requires a change, it is entirely possible to change it. Similarly, if developments in technology render certain steps of one or more of the stored workflows 56 obsolete or cause previously unfeasible steps to become feasible, then such a workflow 56 can likewise be updated.

In an illustrative example, an actionable incident 36 includes an event whose "type" has been set to "three-alarm alarm fire" and whose location is within the jurisdiction of the first responding agency 12 but within a threshold distance of a jurisdictional boundary between the first and second agencies 12, 14. The analysis module 34 would classify this as an "actionable event." Based on actionable event's time and location as well as information about the event, the workflow module 52 selects a stored work flow 56 to be the selected workflow 58.

In the foregoing scenario, the workflow module 52 recognizes a high probability that the first responding agency 12 will require assistance from the second responding agency 14. The selected workflow 58 includes, among its specified tasks, that of communicating the relevant details for the actionable incident 36 to the second responding agency 14. This permits the second responding agency 14 to begin mobilizing, for example by calling upon volunteer firefighters and preparing to send fire engines to the spatial coordinate in the event space.

A typical workflow 56 is an assignable checklist that includes tasks that are assigned to delegates for completion. Such delegates can be individuals or agencies 12, 14.

In some embodiments, the workflow module 52 assigns tasks to specific delegates. However, a more decentralized embodiment implements a swarm method that avoids having to micromanage various entities that have been called upon for assistance, be they affiliated individuals, agencies 12, 14, or alerted parties 78 who are unaffiliated with the agencies 12, 14 but who nevertheless receive alerts 76 from the workflow module 52. In such an embodiment, the workflow module 52 announces available tasks to a swarm of qualified prospective delegates. A prospective delegate from this swarm who wishes to undertake the task communicates an intent to do so back to the inter-agency communication system 10 so that the workflow module 52 can update itself by marking that task as having been assigned and setting reminders to periodically check on the status of its completion.

Since undertaking a task does not always lead to completion of that task, it is useful to have bidirectional communication between the inter-agency communication system 10 and those to whom a task has been assigned, hereafter referred to as "delegates." This permits the delegates to update the inter-agency communication system 10 on the completion of the task or the status of the task. Such an update includes, in some cases, information on whether the task delegated by the inter-agency communication system 10 has been accepted, refused, or reassigned, whether the task's status has changed, for example whether it is in progress, nearing completion, or completed. In other cases, the update includes documents or images that are pertinent to the task, information concerning what action has been taken in connection with the task and when such action occurred, and information concerning impediments to the completion of the task.

In recognition of the fact that things do not always go as planned, the workflow module 52 is further configured to take steps to promote adherence to the selected workflow 58 that has been assigned to each delegate. Such steps include identifying anomalies or deviations from the selected workflow 58 and taking steps in an attempt to correct those anomalies in much the same way that a GPS unit might sense a wrong turn and recalculate a route. Examples of actions that the workflow module 52 may take include an automated reminder 60 that periodically reminds delegates about tasks that are past due. In some cases, the workflow module 52 reassigns a task to a new delegate that may be able to complete it more quickly. In addition, there are cases in which a prospective delegate refuses to undertake a task. In such cases, the workflow module 52 reassigns the task to a new delegate.

The inter-agency communication system 10 takes steps to urge execution of the workflow 56. In some cases, this is carried out automatically, for example by having the workflow module 52 communicate a suitable message to a de-normalizing module 62, which then translates that message into a suitable format and forwards it to the appropriate delegate.

As a result of the bidirectional communication, the workflow module 52 is able to receive communications from a delegate in which the delegate reports completion of a task 58 that was assigned to the delegate by the selected workflow 56 that has been assigned to the delegate. To maintain such information, it is useful for the workflow module 52 to include an auditor 64. The auditor 64 thus provides an audit trail that records what tasks occurred, when they occurred, and who carried them out. Such information is useful after-the-fact for refining the workflows 56 in the workflow set 54.

It is also useful for the workflow module 52 to include modules for providing auxiliary information that accompanies the assigned workflows 56. Such auxiliary information is useful to assist in carrying out the tasks contained in the assigned workflows 56.

In some embodiments, the external information-source 50 provides information that would reasonably be regarded as prompting a change to the current workflow 56. This permits dynamically adapting the workflow 56 as information becomes available. In one example, an external information-source 50 provides a weather feed. In such cases, an analysis module 34 that learns of an approaching squall line from the external information-source 50 may cause the current workflow 56 to be modified to include providing emergency generators should utility power be rendered unavailable.

One such module for providing such auxiliary information is an annotator 66. The annotator 66 adds annotations to the record of the actionable incident 36 or to a map of the region in which the tasks in the workflow 56 are to be carried out. These annotations identify features that a delegate would be expected to find useful for carrying out the tasks in the workflow 56. Examples of such auxiliary information include locations of fire hydrants that are within range of a building that is on fire as well the locations of staging areas for responders.

Another module for providing such auxiliary information that a delegate would be expected to find useful is a GIS layer repository 68. The GIS layer repository 68 provides selected layers for use with an annotated map. Examples of GIS layers that may be useful would include plans of underground infrastructure, such as water lines and electrical lines.

Yet another module for providing such auxiliary information is a document repository 70. The document repository 70 maintains documents that concern the subject matter of the incident 36. For example, if the incident 36 involves a train wreck, a document repository 70 can include a consist of the train's rolling stock and the locations along the consist of cars carrying hazardous cargo.

Another example of a module for providing such auxiliary information is a web-link repository 72. The web-link repository 72 provides pointers to information that would be useful in responding to an incident 36. An example would be a web-link that connects to any one of a set of webcams that are monitoring various portions of the situs of the incident 36.

The de-normalizing module 62 has access to translators 26 and to a switch 30 similar to that used by the normalizing module 28. The de-normalizing module 62 also has information concerning the formats that a third-party system 74 is able to process. In addition, the de-normalizing module 62 has access to translators and a switch, both of which operate in a manner similar to the translators 26 and the switch 28 that have been described in connection with the normalizing module 28. The de-normalizing module 62 thus translates from the format of the normalized data 32 back into a format suitable for the third-party system 74 with which it communicates.

Examples of third-party systems 74 include automated triaging systems that maintain lists of persons qualified to assist in incidents of a particular nature.

Additionally, a de-normalizing module 62 has access to a filter 75 that identifies which information is to be withheld from the third-party system 74 and which information is to be provided to the third-party system 74. This permits the de-normalizing module 62 to provide filtered information, for example by suppressing transmission of certain data fields.

The de-normalizing module 62 relays the message, in the appropriate format and with the appropriate information present, to a corresponding third-party system 74.

In other cases, the inter-agency communication system 10 drives the workflow manually, for example by transmitting an alert 76 directly to an alerted party 78. Among these are embodiments in which the party 78 is associated with an agency 12, 14. Also among these are embodiments in which the alert 76 is broadcast, in which case the alerted party 78 is a member of the general public. Also among these embodiments are those in which the alerted party 78 is a social worker or mental health professional, a translator, an interpreter, an animal-control officer, a hazardous waste specialist, or any other professional or volunteer whose particular skills are deemed to be necessary for successfully responding to the circumstances at hand.

Another example of an actionable incident 36 would be one having an event whose "type" is set to "mass casualty from motor-vehicle accident" and whose location is within a particular distance of an interstate highway. The analysis module 32 identifies the actionable incident 36 and provides it to the workflow module 52. Based on the relationship between the event's location and the locations of various jurisdictional boundaries, the workflow module 52 then selects a workflow 56 that includes, among its specified tasks, that of communicating the particulars of the actionable incident 36 to the departments of transportation for the county in which the actionable incident 36 occurred and for adjacent counties that are contiguous with that county. Among these departments of transportation in these adjacent counties is the second agency 14.

An actionable incident 36 can have more than one event. In such cases, the analysis module 34 uses the pattern of events as a basis for selecting a workflow 56. For example, the analysis module 34 may identify two armed assaults that are proximate in time and space. In such cases, the analysis module 34 selects a workflow 56 that includes extrapolating, based on the pattern of actionable incidents 36, the relative probabilities that the second agency 14 will have to be mobilized to respond to the actionable incident 36.

As an example, if a series of actionable events within a jurisdiction of the first agency 12 defines a vector that points to a boundary between the first agency's jurisdiction and that of the second agency 14, the resulting workflow 56 will typically include the act of notifying the second agency 14 and sharing information about the actionable incident 36 with the second agency 14.

Another example relies on the proposition that the probability of an actionable event at a first site is a conditional probability that is affected by an ongoing actionable event at another one or more additional sites that have features in common with the first site. For example, a large-scale terrorist attack may envision a coordinated attack on numerous facilities of the same type. In such cases, to the extent simultaneity is lacking in the attack, information of the occurrence of one attack is useful for predicting the probability of an attach at a similar facility.

In yet another example, there exists a supervising agency that is associated with or carries out information-sharing with plural agencies. In such cases, an actionable incident within a jurisdiction of a first agency is brought to the attention of the central agency, which will then do what it deems to be necessary with such information. Examples of such actions taken by the supervising agency include notifying other agencies within its purview, calling the FBI, or transmitting an alert to the Centers for Disease Control.

In addition to communicating with the workflow module 52, the analysis module 34 also selects data to seed a situational-awareness container 80. The situational-awareness container 80 contains information that is accessible by both the first and second agency 12, 14 as well as any other agency that is involved in responding to the actionable incident 36.

Examples of information found in the situational-awareness container 80 include task-status information 82 concerning status of tasks that have been assigned to various delegates. Such information provides a basis for visualizing the extent to which the response to the ongoing incident matches that specified by the workflow 56 and draws attention to deviations from the plan as specified by the workflow 56. Other examples of information found in the situational-awareness container 80 include the various selected workflows 58 themselves.

In some embodiments, bidirectional communication discussed in connection with the workflow module 52 also extends to the situational-awareness container 80. In such cases, the situational-awareness container 80 features user-interface elements that allow one to provide or modify information, which can then be communicated to a relevant portion of the inter-agency communication system 10. For example, one who is viewing the situational-awareness container 80 may view a workflow in which certain information has been rendered obsolete by ongoing activity on the part of the various responders and may then correct that information. The situational-awareness container 80 would then propagate that modification to all parties that would benefit from knowing of that modification and to all other portions of the inter-agency communication system 10 that may require updating.

Other examples of information found in the situational-awareness container 80 include update information 84 generated over the course of completing a task, for example as provided by delegates who update the workflow module 52 during the course of the actionable incident 36. Such information is often useful for adaptively modifying subsequent steps in the workflow 56 or to augment information about the incident 36 so as to promote situational awareness among those participating in responding to the actionable incident 36.

Still other examples of information found in the situational-awareness container 80 include messages 86 sent to the various agencies 12, 14, or individuals that are involved in responding to the emergency as well as messages received from those agencies 12, 14, or alerted parties 78. Accordingly, the situational-awareness container 80 also functions as a bulletin board for promoting bidirectional communication between all parties that are cooperating to respond to the incident.

When passing information to the situational-awareness container 80, the analysis module 34 selects only that information provided by the first agency 12 that is expected to be useful to the second agency 14. In some cases, there may be information that must be suppressed because of privacy concerns. The analysis module 34 would prevent such information from being passed in the situational-awareness container 80. In other cases, there may be information that is irrelevant to the second agency 14 and that would therefore simply constitute chaff. The analysis module 34 would likewise prevent such information from being passed into the situational-awareness container 80 for viewing by that agency 14.

In some embodiments, the analysis module 34 includes a tagging module 88 that tags information with different levels of granularity. For example, in addition to restricting data on an agency-by-agency basis, the tagging module 88 tags information so that it cannot be viewed by particular sets of one or more people. Information provided by the tagging module 88 is relied upon by the filter 75 of the de-normalizing module 62 when communicating with the third-party system 74.

In other embodiments, the tagging module 88 tags information based on reciprocity. Thus, if the tagging module 88 recognizes that the second agency 14 does not contribute information of a particular class to the situational-awareness container 80, then the tagging module 88 will tag information of that particular class as not being viewable by the second agency 14 when the second agency 14 inspects the situational-awareness container 80.

In some cases, the situational-awareness container 80 includes a link to the external information-source 50. An example of data from the external information-source 50 is real-time data for map layers of a map of an area relevant to the actionable incident 36. Another example of information from an external information-source 50 is current weather-related information as discussed previously.

In the illustrated embodiment, the situational-awareness container 80 includes a map-based visualizer 90 and a list-based visualizer 92, both of which provide information concerning ongoing incidents 36 in a particular region.

The situational-awareness container 80 uses the map-based visualizer 90 to show a map in which locations of ongoing incidents 36 are marked. Each such marked location links to further detailed information on the particular incident 36.

The situational-awareness container 80 uses the list-based visualizer 92 to provide information similar to that provided by the map-based visualizer 90 but in the form of a list the incidents 36. This is often useful for rapid searching. In some embodiments, it is possible to toggle between a view that uses the list-based visualizer 92 and a view that uses the map-based visualizer 90.

The situational-awareness container 80 also includes an inter-agency searcher 94 to permit one agency to share intelligence with another. For example, if a responder associated with one agency has recently pulled over a vehicle, it is useful to use the inter-agency searcher 94 to poll other agencies, or to search through the accumulated set of normalized incident data, for information about that vehicle.

As shown in FIG. 1, the situational-awareness container 80 is accessible by the first and second agencies 12, 14, either directly or via the third-party system 74.

It is recognized that there may exist a non-subscribing agency 96 that is not a subscriber to the inter-agency communication system 10, as are the first and second agencies 12, 14, but that may nevertheless be called upon to participate in responding to the actionable incident 36. In such cases, it is useful to provide the non-subscribing agency 96 with an evanescent link 98 that can be used only for the duration of the actionable incident 36.

In the illustrated embodiment, the inter-agency communication system 10 provides the evanescent link 98 to the non-subscribing agency 96. This evanescent link 98 provides the non-subscribing agency 96 with a view into either the situational-awareness container 80 or into an analytics module 100.

Since the inter-agency communication system 10 has no practical way to determine the formats that are supported by the non-subscribing agency 96, it provides the information in a universal format. This is carried out by translating the normalized data 32 back into unnormalized data 24, the unnormalized data 24 being in a format that would be accessible to the non-subscribing agency 96. To the extent that certain portions of the information held by the inter-agency communication system 10 are to be withheld, those portions are filtered out so that they are not available to the non-subscribing agency 96.

Figure 2:
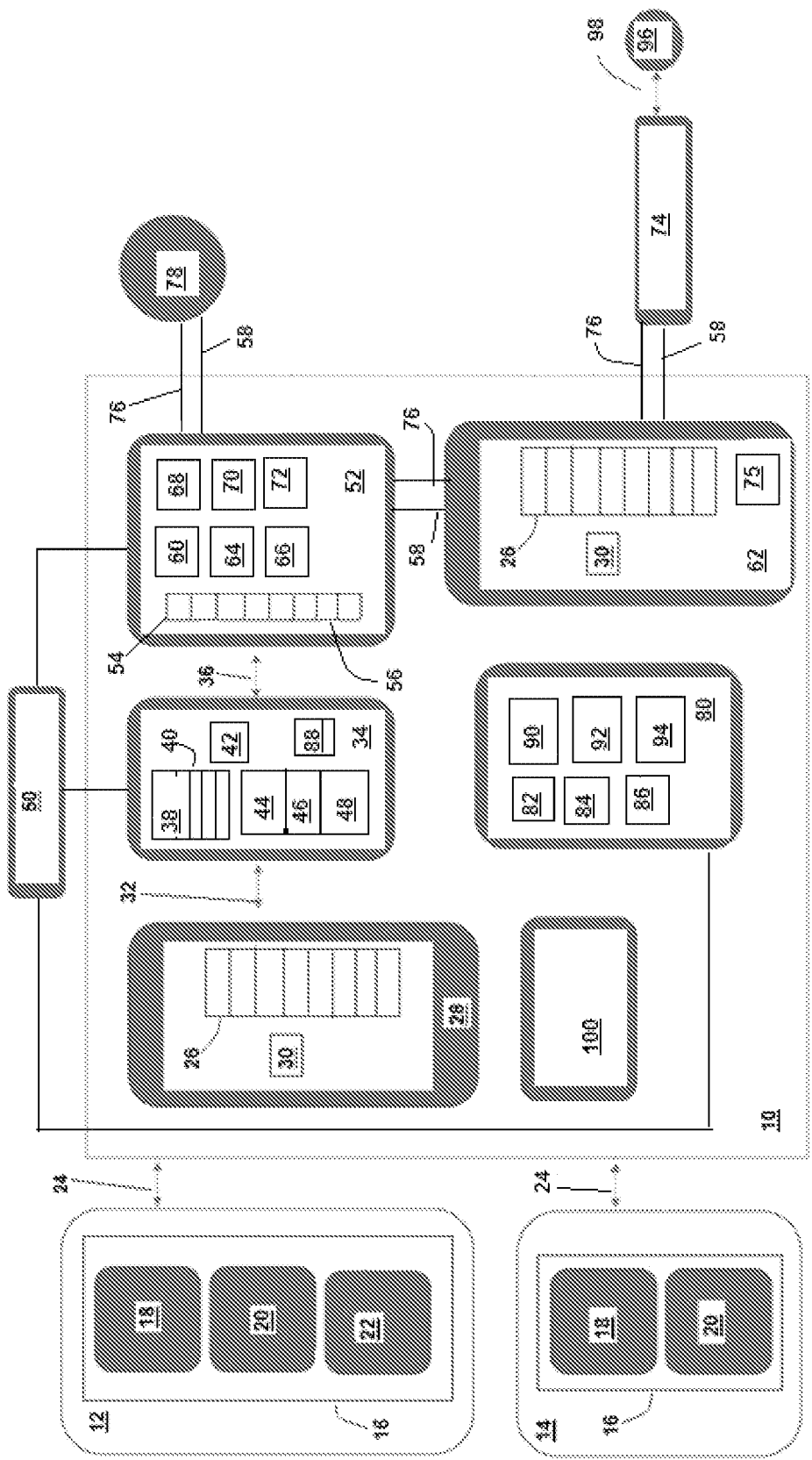

FIG. 2 shows an embodiment in which it is the third-party system 74 rather than the inter-agency communication system 10 that provides an evanescent link 98 to the non-subscribing agency 96. Since the third-party system 74 only has whatever view of the information that its de-normalizing module 62 provided it with, the non-subscribing agency 96 receives the same information that was provided to the third-party system 74. In some embodiments the evanescent link 98 provides the recipient with temporary access to the situational awareness container 80 containing a view of the shared data.

The various agencies 12, 14, 96 that have access to the situational-awareness container 80 are able to annotate that information so as to update it as the actionable incident 36 progresses.

In some embodiments, the situational-awareness container 80 displays information in a manner that will be familiar to the particular viewer. In the case of the first and second agencies 12, 14 the situational-awareness container 80 displays the information so as to conform to the formats with which those agencies 12, 14 are familiar. This is carried out by operating the translator 26 in reverse so that it converts normalized data 32 into unnormalized data 24 that is in the form preferred by the relevant agency 12, 14. In the case of the non-subscribing agency 96, the situational-awareness container 80 displays the information in the universal format, as noted above. In either case, it is entirely possible for multiple agencies 12, 14, 96 to simultaneously view information about the same actionable incident 36.

In some embodiments, the inter-agency communication system 10 further includes an analytics module 100 that collects information concerning the effects of the various actions in the selected workflow 56 upon the unfolding of the actionable incident 36 from its onset to its termination. Such information is useful for carrying out ex post facto analysis of the workflow 56 in an effort to further improve the manner in which incidents of the relevant type are responded to in the future. In some embodiments, information from the analytics module 100 is useful to drive a machine-learning system to automatically cause workflows 56 to evolve over time.

The foregoing discussion referred to only one second agency 14. In practice, there may be more than one such second agency 14 and one non-subscribing agency 96. The principles of the inter-agency communication system 10 are not affected to any significant extent by having plural second agencies 14.

The invention claimed is:

1. An inter-agency communication system comprising one or more digital processing devices and one or more software modules that, when executed by the one or more digital processing devices, cause the inter-agency communication system to perform a set of operations comprising:
receiving, from a first emergency-response agency, first unnormalized data in a first unnormalized format supported by the first emergency-response agency;
receiving, from a second emergency-response agency, second unnormalized data in a second unnormalized format supported by the second emergency-response agency;
translating the first unnormalized data into first normalized data by translating the first unnormalized data from the first unnormalized format into a normalized format;
translating the second unnormalized data into second normalized data by translating the second unnormalized data from the second unnormalized format into the normalized format;
identifying an actionable incident from a set of normalized data comprising the first normalized data and the second normalized data, wherein identifying the actionable incident comprises determining that the set of normalized data comprises data identifying a type, location, or time of an event;
selecting a workflow that corresponds to the identified actionable incident, wherein the selected workflow comprises a first task for the first emergency-response agency and a second task for the second emergency-response agency;
providing the selected workflow to the first and second emergency-response agencies, wherein providing the selected workflow to the first and second emergency-response agencies comprises (a) translating the workflow to a first unnormalized workflow format supported by the first emergency-response agency, (b) translating the workflow to a second unnormalized workflow format supported by the second emergency-response agency, (c) providing the workflow to the first emergency-response agency in the first unnormalized workflow format, and (d) providing the workflow to the second emergency-response agency in the second unnormalized workflow format;
receiving, from the first emergency-response agency, first workflow data in the first unnormalized workflow format indicating completion of the first task;
in response to receiving the first workflow data, automatically providing, to the second emergency-response agency, second updated workflow data in the second unnormalized workflow format indicating the completion of the first task;
receiving, from the second emergency-response agency, third workflow data in the second unnormalized workflow format indicating completion of the second task;
in response to receiving the third workflow data, automatically providing, to the first emergency-response agency, fourth updated workflow data in the first unnormalized workflow format indicating the completion of the first task;
receiving, from the first emergency-response agency, fifth workflow data in the first unnormalized workflow format for modifying the workflow;
in response to receiving the fifth workflow data, automatically providing, to the second emergency-response agency, a modified workflow in the second unnormalized workflow format; and
causing selected information concerning the actionable incident to be made available to the first and second emergency-response agencies by storing the selected information in a data container accessible by the first and second emergency-response agencies.

2. The inter-agency communication system of claim 1, wherein the set of operations further comprises storing a set of pre-defined workflows, and wherein selecting the workflow that corresponds to the identified actionable incident comprises selecting one of the pre-defined workflows based on the data identifying the type, location, or time of the event.

3. The inter-agency communication system of claim 1, wherein the set of operations further comprises causing selected information relevant to the actionable incident to be excluded from the data container, thereby preventing the excluded information from being made available to both the first and second emergency-response agencies.

4. The inter-agency communication system of claim 1, wherein the set of operations further comprises (i) receiving the first unnormalized data from a first computer-aided dispatch system that is local to the first emergency-response agency or (ii) receiving the second unnormalized data from a second computer-aided dispatch system that is local to the second emergency-response agency.

5. The inter-agency communication system of claim 1, wherein the set of operations further comprises (i) receiving the first unnormalized data from a first automatic vehicle-location system that is local to the first emergency-response agency or (ii) receiving the second unnormalized data from a second automatic vehicle-location system that is local to the second emergency-response agency.

6. The inter-agency communication system of claim 1, wherein the to set of operations further comprises (i) receiving the first unnormalized data from a first surveillance system that is local to the first emergency-response agency or (ii) receiving the second unnormalized data from a second surveillance system that is local to the second emergency-response agency.

7. The inter-agency communication system of claim 1, wherein the set of operations further comprises updating a system that is local to one of the first or second emergency-response agencies.

8. The inter-agency communication system of claim 1, wherein the set of operations further comprises providing an evanescent link to a non-subscribing agency separate from the first and second emergency-response agencies, the evanescent link being one that expires after the actionable incident has completed, and wherein the evanescent link enables the non-subscribing agency to receive information concerning a particular incident.

9. The inter-agency communication system of claim 1, wherein causing the selected information concerning the actionable incident to be made available to the first and second emergency-response agencies further comprises providing an evanescent link to a non-subscribing agency separate from the first and second emergency-response agencies, and wherein the evanescent link permits the non-subscribing agency to access the data container so as to view the selected information concerning the actionable incident that is made available to the first and second emergency-response agencies subject to a restriction imposed by the inter-agency communication system on access to the selected information by the non-subscribing agency.

10. The inter-agency communication system of claim 1, wherein the set of operations further comprises permitting the first and second emergency-response agencies to modify information that is in the data container.

11. The inter-agency communication system of claim 1, wherein the set of operations further comprises translating at least a portion of the set of normalized data into third unnormalized data and providing the third unnormalized data to a non-subscribing agency separate from the first and second emergency-response agencies.

12. The inter-agency communication system of claim 1, further comprising a rule repository, wherein the rule repository stores rules provided by each of a plurality of subscribing agencies comprising the first and second emergency-response agencies, and wherein the set of operations further comprises receiving information indicative of an occurrence of a condition and using the information indicative of the occurrence of the condition to cause a rule from the rule repository to execute along a particular execution path that corresponds to the condition.

13. The inter-agency communication system of claim 1, further comprising a repository of associations between conditions and execution paths, and wherein the set of operations further comprises detecting that a condition stored in the repository has occurred and causing a rule to be executed along an execution path that is associated with the condition in the repository.

14. The inter-agency communication system of claim 1, wherein the set of operations further comprises (i) transmitting at least a portion of the selected workflow to a delegate, and (ii) transmitting reminders to the delegate in response to failing to detect completion of a task in the workflow by a particular deadline.

15. The inter-agency communication system of claim 1, wherein the set of operations further comprises receiving external information from an external-information source and updating information in the data container based on the external information.

16. The inter-agency communication system of claim 1, wherein the set of operations further comprises (i) receiving external information from an external information-source, (ii) using the external information to determine that a condition has been met, and (iii) modifying a rule that has been provided by one of the first or second emergency-response agencies such that the rule, when executed, follows an execution path that depends on the condition having been met.

17. A method comprising:
receiving, from a first emergency-response agency, first unnormalized data in a first unnormalized format supported by the first emergency-response agency;
receiving, from a second emergency-response agency, second unnormalized data in a second unnormalized format supported by the second emergency-response agency;
translating the first unnormalized data into first normalized data by translating the first unnormalized data from the first unnormalized format into a normalized format;
translating the second unnormalized data into second normalized data by translating the second unnormalized data from the second unnormalized format into the normalized format;
identifying an actionable incident from a set of normalized data comprising the first normalized data and the second normalized data, wherein identifying the actionable incident comprises determining that the set of normalized data comprises data identifying a type, location, or time of an event;
selecting a workflow that corresponds to the identified actionable incident, wherein the selected workflow comprises a first task for the first emergency-response agency and a second task for the second emergency-response agency;
providing the selected workflow to the first and second emergency-response agencies, wherein providing the selected workflow to the first and second emergency-response agencies comprises (a) translating the workflow to a first unnormalized workflow format supported by the first emergency-response agency, (b) translating the workflow to a second unnormalized workflow format supported by the second emergency-response agency, (c) providing the workflow to the first emergency-response agency in the first unnormalized workflow format, and (d) providing the workflow to the second emergency-response agency in the second unnormalized workflow format;
receiving, from the first emergency-response agency, first workflow data in the first unnormalized workflow format indicating completion of the first task;
in response to receiving the first workflow data, automatically providing, to the second emergency-response agency, second updated workflow data in the second unnormalized workflow format indicating the completion of the first task;

receiving, from the second emergency-response agency, third workflow data in the second unnormalized workflow format indicating completion of the second task;

in response to receiving the third workflow data, automatically providing, to the first emergency-response agency, fourth updated workflow data in the first unnormalized workflow format indicating the completion of the first task;

receiving, from the first emergency-response agency, fifth workflow data in the first unnormalized workflow format for modifying the workflow;

in response to receiving the fifth workflow data, automatically providing, to the second emergency-response agency, a modified workflow in the second unnormalized workflow format; and causing selected information concerning the actionable incident to be made available to the first and second emergency-response agencies by storing the selected information in a data container accessible by the first and second emergency-response agencies.

18. The method of claim 17, further comprising (i) receiving the first unnormalized data from a first computer-aided dispatch system that is local to the first emergency-response agency or (ii) receiving the second unnormalized data from a second computer-aided dispatch system that is local to the second emergency-response agency.

19. The method of claim 17, further comprising (i) receiving the first unnormalized data from a first automatic vehicle-location system that is local to the first emergency-response agency or (ii) receiving the second unnormalized data from a second automatic vehicle-location system that is local to the second emergency-response agency.

20. The method of claim 17, further comprising (i) receiving the first unnormalized data from a first surveillance system that is local to the first emergency-response agency or (ii) receiving the second unnormalized data from a second surveillance system that is local to the second emergency-response agency.

* * * * *